(12) United States Patent
Oh et al.

(10) Patent No.: US 12,374,094 B2
(45) Date of Patent: Jul. 29, 2025

(54) METHOD AND APPARATUS FOR FEATURE TRANSFORMING AND PROCESSING BASED ON ARTIFICIAL NEURAL NETWORK

(71) Applicant: ELECTRONICS AND TELECOMMUNICATIONS RESEARCH INSTITUTE, Daejeon (KR)

(72) Inventors: Sung Chan Oh, Daejeon (KR); Yong Jin Kwon, Daejeon (KR); Hyung Il Kim, Daejeon (KR); Jin Young Moon, Daejeon (KR); Yu Seok Bae, Daejeon (KR); Ki Min Yun, Daejeon (KR); Jeun Woo Lee, Daejeon (KR); Joong Won Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 352 days.

(21) Appl. No.: 17/939,615

(22) Filed: Sep. 7, 2022

(65) Prior Publication Data
US 2023/0145028 A1    May 11, 2023

(30) Foreign Application Priority Data
Nov. 10, 2021    (KR) .................. 10-2021-0153963

(51) Int. Cl.
G06V 10/82        (2022.01)
G06N 3/04         (2023.01)
G06V 10/77        (2022.01)

(52) U.S. Cl.
CPC .............. *G06V 10/82* (2022.01); *G06N 3/04* (2013.01); *G06V 10/7715* (2022.01)

(58) Field of Classification Search
CPC .. G06V 10/82; G06V 10/7715; G06V 10/454; G06V 10/84; G06V 10/40;
(Continued)

(56) References Cited

U.S. PATENT DOCUMENTS 7,006,088 B1    2/2006    Guskov et al.
7,050,612 B2    5/2006    Hale
(Continued)

OTHER PUBLICATIONS

"Nagma Khan et. al., Graph Convolutional Network for Multi-Label VHR Remote Sensing Scene Recognition, Sep. 2019, Neurocomputing, vol. 357, pp. 36-46" (Year: 2019).*
(Continued)

*Primary Examiner* — Chineyere Wills-Burns
*Assistant Examiner* — Phuong Hau Cai
(74) *Attorney, Agent, or Firm* — KILE PARK REED & HOUTTEMAN PLLC

(57) ABSTRACT

Disclosed herein are a method and apparatus for processing feature information based on an artificial neural network. According to an embodiment of the present disclosure, the apparatus for processing feature information based on an artificial neural network may include a memory for storing data and a processor for controlling the memory, and the processor may further be configured to extract a graph, which includes vertices, based on a feature map of an image, to extract a feature vector corresponding to the vertices and to process the graph and the feature vector based on an artificial neural network, and the graph may include positions of the vertices and information on a connection relationship between the vertices.

12 Claims, 9 Drawing Sheets

(58) Field of Classification Search
CPC .......... G06N 3/04; G06N 3/045; G06N 3/048; G06N 3/08; G06N 3/084
See application file for complete search history.

(56) References Cited

U.S. PATENT DOCUMENTS

| | | |
|---|---|---|
| 10,776,923 B2 | 9/2020 | Dufort |
| 2016/0358039 A1 | 12/2016 | Ko et al. |
| 2020/0175259 A1 | 6/2020 | Noh et al. |

OTHER PUBLICATIONS

"Jeen-Shing Wang et. al., A k-nearest-neighbor classifier with heart rate variability feature-based transformation algorithm for driving stress recognition, Sep. 2013, Neurocomputing, vol. 116, pp. 136-143" (Year: 2013).*

"Bailin Yang et. al., 3D Geometry-dependent Texture Map Compression with a Hybrid ROI Coding, Jun. 2013, Science China / Information Sciences, Research Paper, vol. 57, pp. 1-15" (Year: 2013).*

"Li Zhang et. al., A Feature-Importance-Aware and Robust Aggregator for GCN, 2020, Proceedings of the 29th ACM International Conference on Information & Knowledge Management, pp. 1813-1822" (Year: 2020).*

"Roberto Baldoni et. al., Unsupervised Features Extraction for Binary Similarity Using Graph Embedding Neural Networks, Nov. 2018, Machine Learning, Parallel, and Cluster Computing" (Year: 2018).*

Song Ouyang et al., 'Combining Deep Semantic Segmentation Network and Graph Convolutional Neural Network for Semantic Segmentation of Remote Sensing Imagery', Remote Sens. 2021, 13, 119. (Dec. 31, 2020).

M. Bernaschi et al., 'GPU Based Detection of Topological Changes in Voronoi Diagrams' (Jul. 4, 2016).

Li Zhang et al., 'Graph Node-Feature Convolution for Representation Learning' (Nov. 30, 2018).

Boyan Xu et al., 'Graph Convolutional Networks in Feature Space for Image Deblurring and Super-resolution' (May 21, 2021).

* cited by examiner

METHOD AND APPARATUS FOR FEATURE TRANSFORMING AND PROCESSING BASED ON ARTIFICIAL NEURAL NETWORK

CROSS REFERENCE TO RELATED APPLICATION

The present application claims priority to Korean Patent Application Nos. 10-2021-0153963 filed Nov. 10, 2021, the entire contents of which is incorporated herein for all purposes by this reference.

BACKGROUND OF THE INVENTION

1. Field of the Invention

The present disclosure relates to a method and apparatus for processing feature information based on an artificial neural network. More particularly, the present disclosure relates to a technology of processing feature information based on an artificial neural network that is efficient with respect to memory and parameters.

2. Description of the Related Art

In recent years, the machine learning technology is applied to various areas including software engineering, financing and economy, and in particular has become a core technology that brings out a significant breakthrough in computer vision and image processing.

As an area of artificial intelligence (AI), the machine learning technology refers to algorithms and relevant fields that learn patterns or features from given data and analyze new data. Recently, as a machine learning technique called deep learning emerges as a core technique, interest is growing in relevant techniques and applications.

A deep learning technique is a model of an artificial neural network imitating the nervous system of a living organism, and an existing artificial neural network model is constructed by connecting thin layers of neuron models, while the deep learning technique builds deep layers of a neuron model in order to enhance the learning capability of a neural network.

For image data processing based on artificial neural networks, convolutional neural networks requiring a plurality of parameters and memory usage are one of the most representative types of neural networks.

Convolution layers constituting a convolutional neural network (CNN) consists of a convolution operation, bias addition, and a non-linear activation function. In case a $C_{m,in}$-channel feature map $F_{in}(i, j, c_{in})$ is output using $C_{m,out}$-channel 2D dimensional feature map $F_{out}(i, j, c_{out})$ as input, a computational procedure of $K_h \times K_w$ 2D convolution layers may be represented by Equation 1.

[Equation 1]

$$F_{out}(i, j, c_{out}) = \rho \left( \sum_{c'=0}^{c_{m,in}-1} \sum_{\substack{0 \le i' < K_h \\ 0 \le j' < K_w}} w_{c_{out}}[i', j', c'] \cdot F_{in}\left[i + i' - \left\lfloor \frac{K_h}{2} \right\rfloor, j + j' - \left\lfloor \frac{K_w}{2} \right\rfloor, c'\right] + b_{c_{out}} \right)$$

$(i, j) \in [0, H) \times [0, W), \quad 0 \le c_{out} < C_{m,out}$ $W_{cout}$ and $b_{cout}$ in Equation 1 are a weight and a bias parameter respectively and are updated according to learning. In the above construction, the number of parameters to learn is $(K_h K_w C_{g,in}+1)C_{g,out}$, and the memory for storing an output feature map of a corresponding layer is proportional to $HWC_{out}$.

Meanwhile, as there is much redundant data between an usual image and a feature map derived from the image, an actual and effective amount of information of the image is smaller than a memory consumption of the feature map, which causes inefficiency of implementation.

SUMMARY OF THE INVENTION

The present disclosure is directed to performing feature information processing based on an artificial neural network capable of reducing parameters and memory usage.

The present disclosure is directed to using an artificial neural network like graph convolution networks (GCN), which are efficient in aspects like memory and the number of parameters, instead of convolutional neural networks (CNN) for image processing.

The present disclosure is directed to using an artificial neural network for environment-adaptive information processing by giving flexibility to input data of the artificial neural network.

Other objects and advantages of the present invention will become apparent from the description below and will be clearly understood through embodiments. In addition, it will be easily understood that the objects and advantages of the present disclosure may be realized by means of the appended claims and a combination thereof.

According to an embodiment of the present disclosure, an apparatus for processing feature information based on an artificial neural network may include a memory configured to store data and a processor configured to control the memory, and the processor may further be configured to extract a graph, which includes vertices, based on a feature map of an image, to extract a feature vector corresponding to the vertices and to process the graph and the feature vector based on an artificial neural network, and the graph may include positions of the vertices and information on a connection relationship between the vertices.

Meanwhile, the artificial neural network may be a graph convolution network (GCN).

Meanwhile, the information on the connection relationship between the vertices may include an edge set and an adjacency matrix for the vertices.

Meanwhile, the edge set and the adjacency matrix may be obtained using a k-nearest neighbors algorithm, a random sampling algorithm, or a Delaunay triangulation algorithm.

Meanwhile, the feature vector may be obtained through a graph convolution layer.

Meanwhile, the feature vector may be obtained using a k-nearest neighbors algorithm or a random sampling algorithm.

Meanwhile, the vertices may be obtained using the feature map and an importance map for the feature map, which is obtained through a convolution layer.

According to an embodiment of the present disclosure, a method for processing feature information based on an artificial neural network may include: extracting a graph consisting of vertices based on a feature map of an image; extracting a feature vector corresponding to the vertices; and processing the graph and the feature vector based on an artificial neural network, and the graph may include positions of the vertices and information on a connection relationship between the vertices.

Meanwhile, the artificial neural network may be a graph convolution network (GCN).

Meanwhile, the information on the connection relationship between the vertices may include an edge set and an adjacency matrix for the vertices.

Meanwhile, the edge set and the adjacency matrix may be obtained using a k-nearest neighbors algorithm, a random sampling algorithm, or a Delaunay triangulation algorithm.

Meanwhile, the feature vector may be obtained through a graph convolution layer.

Meanwhile, the feature vector may be obtained using a k-nearest neighbors algorithm or a random sampling algorithm.

Meanwhile, the vertices may be obtained using the feature map and an importance map for the feature map, which is obtained through a convolution layer.

According to an embodiment of the present disclosure, an apparatus for processing feature information based on an artificial neural network may include a memory configured to store data and a processor configured to control the memory, and the processor may further be configured to obtain a graph, which includes vertices for a feature map processed based on an artificial neural network, and a feature vector, to output the feature map of the image based on the graph and the feature vector, and to obtain a per-pixel analysis result of the image based on the feature map, and the graph may include positions of the vertices and information on a connection relationship between the vertices.

According to an embodiment of the present disclosure, it is possible to reduce the number of parameters and memory usage, when processing feature information based on an artificial neural network.

According to an embodiment of the present disclosure, it is possible to perform environment-adaptive information processing based on an artificial neural network.

According to an embodiment of the present disclosure, it is possible to have a receptive field with flexible shape, when processing feature information based on an artificial neural network.

Effects, which may be obtained from embodiments of the present disclosure, are not limited to the above-mentioned effects, and other effects not mentioned herein may be clearly understood based on the following description of the embodiments of the present disclosure by those skilled in the art to which a technical configuration of the present disclosure is applied. Effects not intended by performing a configuration described in the present disclosure may also be derived from the embodiments of the present disclosure by those skilled in the art.

DESCRIPTION OF THE PREFERRED EMBODIMENTS

Figure 1:
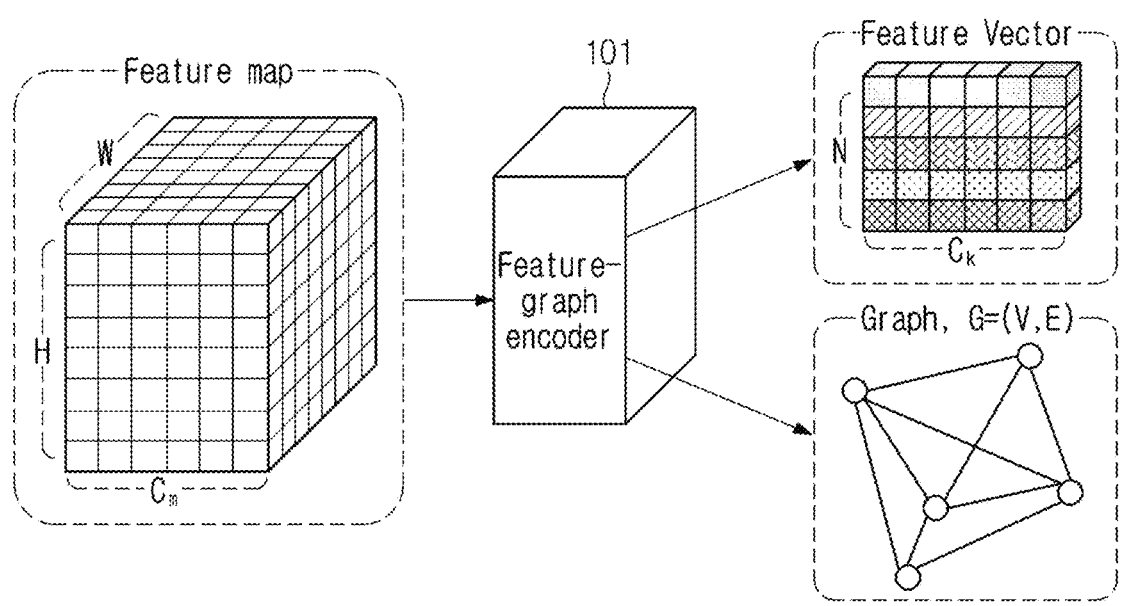
FIG. 1 illustrates transformation of a feature map into a graph according to an embodiment of the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Also, in the drawings, parts not related to the description of the present disclosure are omitted, and like parts are designated by like reference numerals.

In the present disclosure, components that are distinguished from each other are intended to clearly illustrate respective features, which does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Before the present disclosure is described in detail, a graph convolution network (GCN) will be described first, as it is one of the artificial neural networks applicable to the present disclosure.

Generally, a graph convolution network (GCN) may be used to analyze individually distributed information like in language processing, a molecular structure and a social network. A computation process of graph convolution may be expressed by Equation 2.

$$F_{out} = \rho(AF_{in}W + b) \qquad \text{[Equation 2]}$$

Inputs of a graph convolution layer are a graph $G=(V, E)$, which consists of n vertices and an edge connecting the vertices, and a $C_{g,in}$-channel feature vector corresponding to each vertex. In Equation 2, $F_{in}$ is a $N \times C_{g,in}$ matrix having a $C_{g,in}$-channel vector as each row, and $W$ and $b$ are a $C_{g,in} \times C_{g,out}$ weight matrix and a $C_{g,out}$ bias vector parameter respectively. In addition, A of Equation 2 is a $N \times N$ adjacency matrix, representing a connection relationship based on an edge of the graph, that is, a connection relationship between vertices. Herein, the number of parameters of a graph convolution layer is $(C_{g,in}+1) C_{g,out}$, and if $C_{g,in}=C_{m,in}$ and $C_{g,out}=C_{m,out}$ are assumed, $(C_{g,in}+1) C_{g,out}$ is about $$\frac{1}{K_h K_w}$$

times as many as the number of parameters of a 2D convolution layer.

TABLE 1

| | Kernel size | # channel (input, output) | # output element | # learning parameter (weight + bias) | Memory footprint |
|---|---|---|---|---|---|
| 2D convolution layer | $K_h \times K_w$ | $C_{in}$, $C_{out}$ | $H \times W$ | $C_{in}C_{out}K_hK_w +$ $C_{out}$ | $HWC_{out}$ |
| Graph convolution layer | — | | N | $C_{in}C_{out} +$ $C_{out}$ | $NC_{out}$ |

Table 1 compares and summarizes the difference between a 2D convolution layer and a graph convolution layer.

Assuming that the two layers have a same number of input/output feature channels represented by $C_{in}$ and $C_{out}$ respectively, since the 2D convolution layer has learning parameters about $K_h K_w$ times as many as those of the graph convolution layer, the graph convolution layer is more efficient in the storage capacity of learning parameters.

As an image signal provided to an image information processing apparatus has a 2D array in most times, it is an advantage that a convolution layer is available without a further process. Meanwhile, as a coordinate of a feature map in a CNN corresponds to a spatial or time coordinate, it has an advantage of analyzing a spatial relationship between datasets, but there may be a lot of redundant data because a feature vector is placed in every pixel. In the layer configuration of Table 1, a memory proportional to $HWC_{out}$ is needed for storing an output feature map. When the link between a vertex and an edge in a graph of GCN is suitable set to satisfy N<HW, the graph convolution layer has a lower memory requirement than the 2D convolution layer. As information in a general image is frequently redundant in space, the number of vertices useful for information processing is far smaller than that of pixels of the image (N«HW). In a preliminary experiment, the number (N) of vertices does not reach even 1/10 of that of pixels in a feature map.

Meanwhile, the graph convolution network (GNC) is advantageous in that it is suitable for data processing associated with a sparse form of inputs or a connection relationship between individual nodes and has low memory complexity and low storage capacity for neural network parameters, but is difficult to apply to 2D images.

In the present disclosure described in details with reference to the drawings below, a feature information processing technique proposed by the present disclosure will be described which derives a graph and a feature vector of each vertex from a feature map or an input image and applies a graph convolution network (GCN). However, since this is for clear description of the present disclosure, it is obvious that an artificial neural network of the present disclosure can be any other network than a GCN and is not limited by the present disclosure.

FIG. 1 illustrates transformation of a feature map into a graph according to an embodiment of the present disclosure. Specifically, FIG. 1 is directed to describe a process of transforming a feature map by means of a graph feature encoder 101.

A graph feature encoder 101 module may receive a feature map with a spatial size of H×W and a channel of $C_m$ as an input. Based on the feature map, the encoder 101 may extract a graph consisting of N random vertices V and $C_g$ channel feature vectors corresponding to individual vertices. That is, the encoder 101 may transform and express the feature map into a feature vector $F_g$ represented by N×$C_g$ and a graph G=(V, E) including vertices V and edges E connecting vertices. Then, the feature vector and the graph may be available to subsequent memory-efficient data processing using an artificial neural network (e.g., a graph convolution network (GCN)).

Meanwhile, the encoder of FIG. 1 may be an ANN-based feature information processing apparatus of FIG. 8 or be included therein and may be a subject that performs a feature information processing method described with reference to FIG. 2 to FIG. 6 below.

A feature information processing process associated with a graph feature transformation process will be described in further detail with reference to another drawing below.

Figure 2:
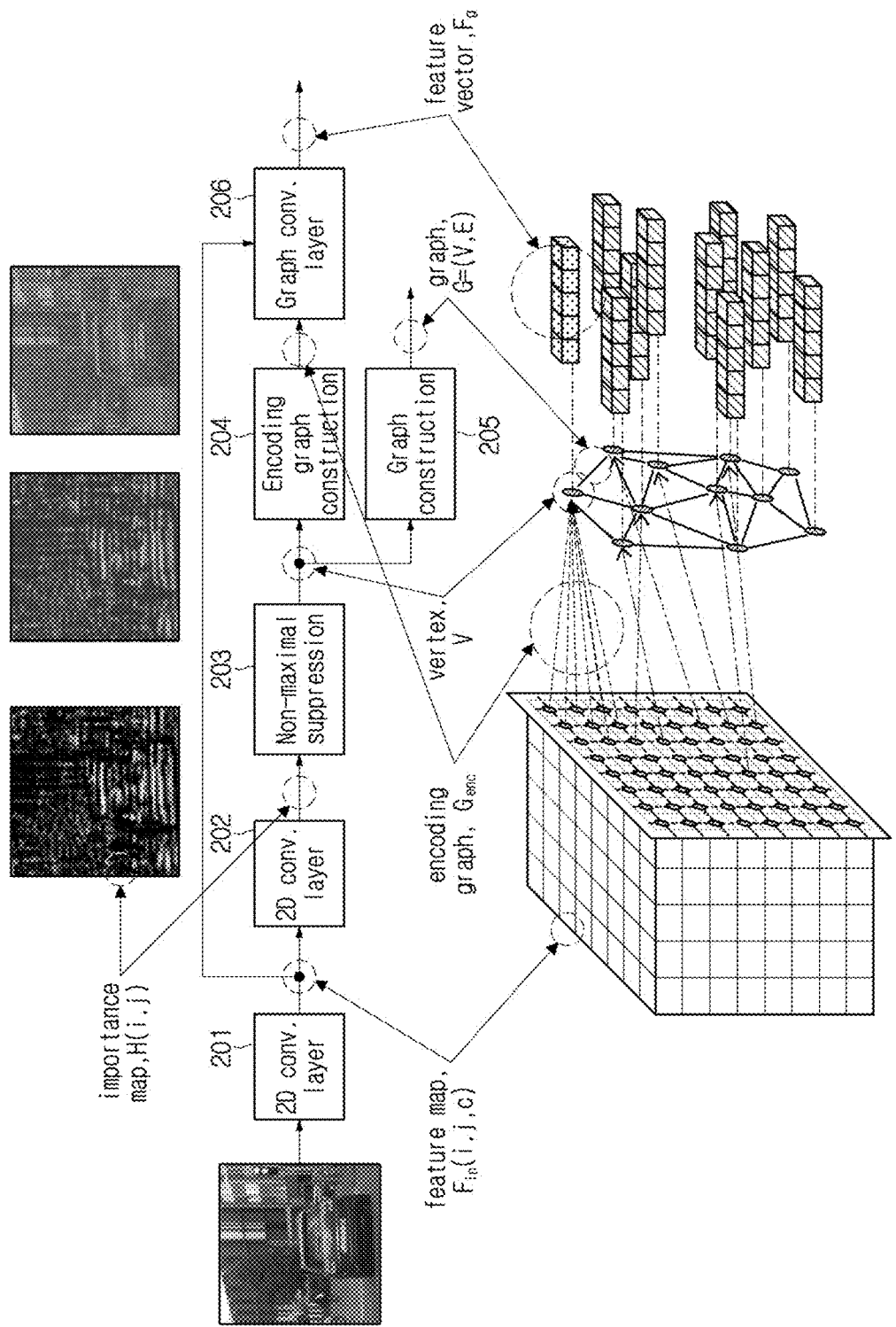
FIG. 2 illustrates a transformation process of a feature map into a graph according to an embodiment of the present disclosure.

FIG. 2 illustrates a transformation process of a feature map into a graph according to an embodiment of the present disclosure.

As an example, it is assumed that an input image or a feature map is given. The input image may be processed through a 2D convolution layer 201, and thus a feature map for the image may be generated.

In addition, the feature map for the image may be expressed by i, j, and c coordinates and be represented like $F_{in(i,j,c)}$ (or F(i, j)). For a vertex for extracting a graph feature for the input image, it is possible to use an important map H(i, j) that is obtained by using an input feature map and a 2D convolution layer. As an example, the importance map may be obtained by passing a feature map through the 2D convolution layer 202 again.

The importance map thus obtained may be used to obtain a vertex of a graph. The vertex of a graph may be extracted through non-maximal suppression 203.

The vertex of a graph, which is extracted through non-maximal suppression, may be input into an encoding graph construction 204 module and a graph construction 205 module.

An edge set E representing connection of vertices of a graph and an adjacency matrix A representing a connection relationship between each vertex may be obtained through the graph construction 205 module. As an example, the graph construction module may be implemented based on a K-nearest neighbors algorithm, a random sampling algorithm, a Delaunay triangulation algorithm and the like.

Since a graph G obtained from the graph construction module includes only information on a position of a vertex V and a connection relationship between vertices, for subsequent information processing based on an artificial neural network (e.g., GCN), a feature map F(i, j) may have to be transformed into a feature vector $F_g$ of each vertex.

In this regard, in this embodiment, the encoding graph construction 204 module may be used to generate a graph $G_{enc}$ that has a pixel of a feature map as an input vertex and a corresponding vertex V of graph as an output vertex. As an example, the pixel of the feature map and the vertex of the graph may have one-to-one correspondence but may also have n-to-one correspondence. That is, a pixel of a feature may be associated with each vertex of a graph. Like the graph construction module, the encoding graph construction module may use a K-nearest neighbors algorithm, a random sampling algorithm and the like.

Next, a feature vector $F_g$ may be obtained by passing a per-pixel feature vector extracted from a feature map through the graph convolution layer 206.

In the process of FIG. 2 described above, a graph G=(V, E), which includes a vertex and an edge representing a connection relationship between vertices, may be associated with each feature vector that is obtained through the graph convolution layer 206. Specifically, each vertex of a graph may be connected with another vertex, and a feature vector may be associated with each vertex.

Figure 6:
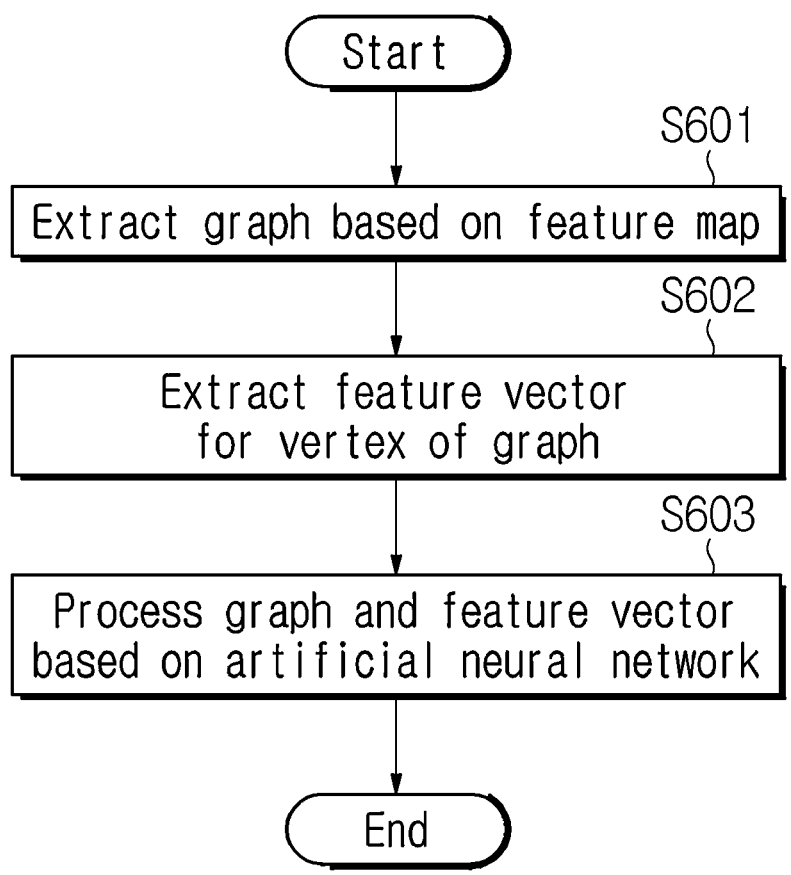
FIG. 6 illustrates a method for processing feature information based on an artificial neural network according to an embodiment of the present disclosure.
Figure 7:
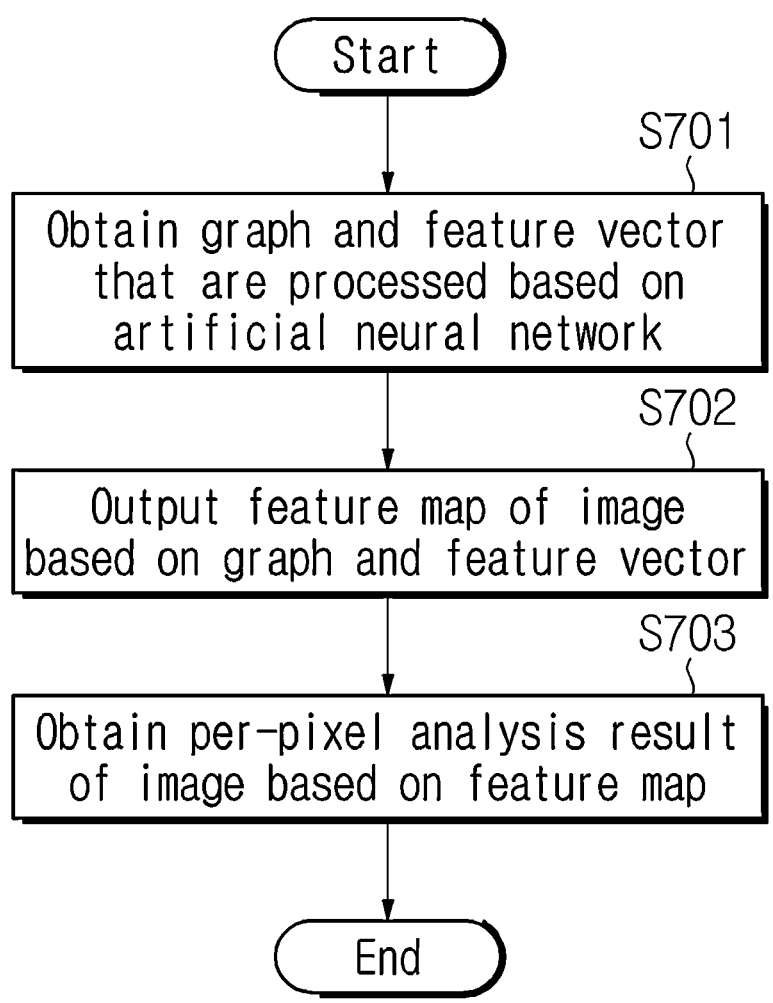
FIG. 7 illustrates a method for processing feature information based on an artificial neural network according to another embodiment of the present disclosure.
Figure 8:
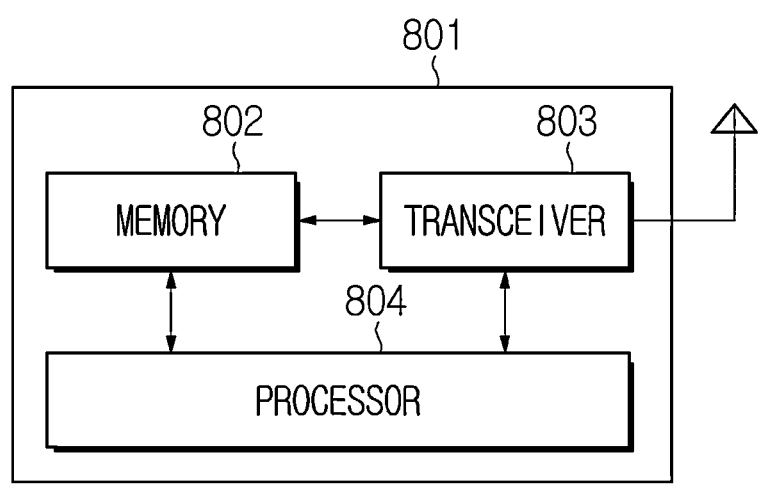
FIG. 8 illustrates an apparatus for processing feature information based on an artificial neural network according to an embodiment of the present disclosure.

Meanwhile, the above process may be implemented by the encoder of FIG. 1 or the ANN-based feature information processing apparatus of FIG. 8 and be included in the ANN-based feature information processing method of FIG. 6 and FIG. 7. This will be described in further detail with reference to each drawing below.

Figure 3:
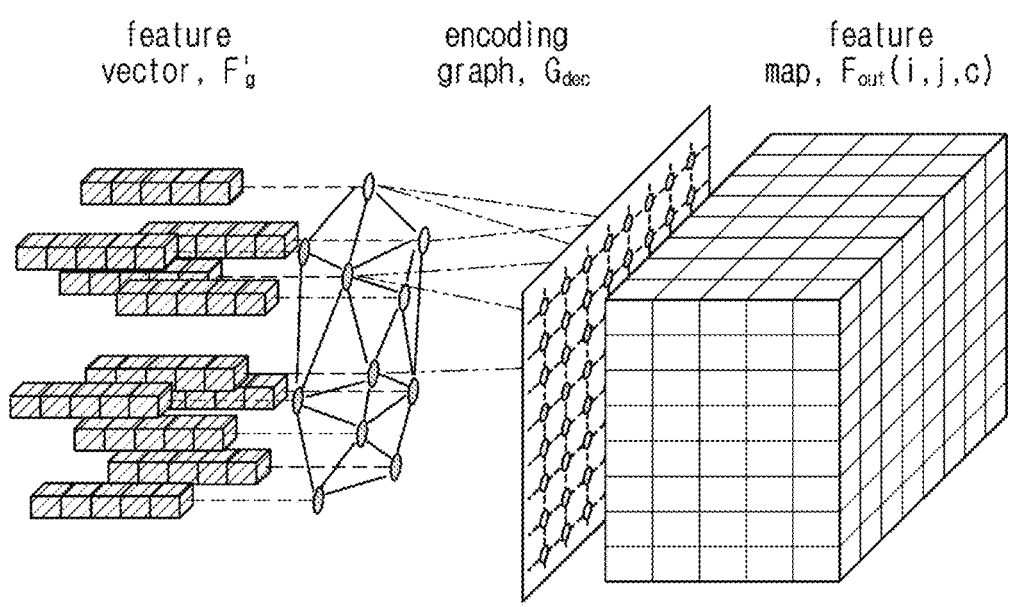
FIG. 3 illustrates transformation of a graph into a feature map according to an embodiment of the present disclosure.

FIG. 3 illustrates transformation of a graph into a feature map according to an embodiment of the present disclosure.

As an example, FIG. 3 may be based on a graph (G=(V, E)) and a feature vector $F_g'$, which are generated through the graph-feature vector transformation of a feature map described above.

Transformation like in FIG. 3 may be performed to apply the present disclosure to image segmentation, motion estimation and other application examples that require a feature map or an output in an image form. The transformation of FIG. 3 may be an inverse process to the transformation of FIG. 2 and be implemented by a decoder module or the ANN-based feature information processing apparatus of FIG. 8. The transformation process of FIG. 3 may be a process of transforming a graph and a feature vector into a feature map.

As an example, contrary to the encoder of FIG. 1, transformation of a graph into a feature map in FIG. 3 may be implemented by a graph $G_{dec}$, which has a graph including a vertex and an edge representing a connection relationship between vertices as an input and a pixel of a feature map as an output, and an artificial neural network (e.g., GCN). As an example, $G_{dec}$ may be obtained because an edge from a vertex to a pixel of a feature map can be acquired by reversing the direction of an edge connecting each vertex and an associated pixel of the feature map in the graph $G_{dec}$ generated in the encoder. An output feature map $F_{out(i,j,c)}$ may be obtained using $G_{dec}$.

This process will be described in further detail with reference to FIG. 4, FIG. 5, FIG. 7 and FIG. 8.

Figure 4:
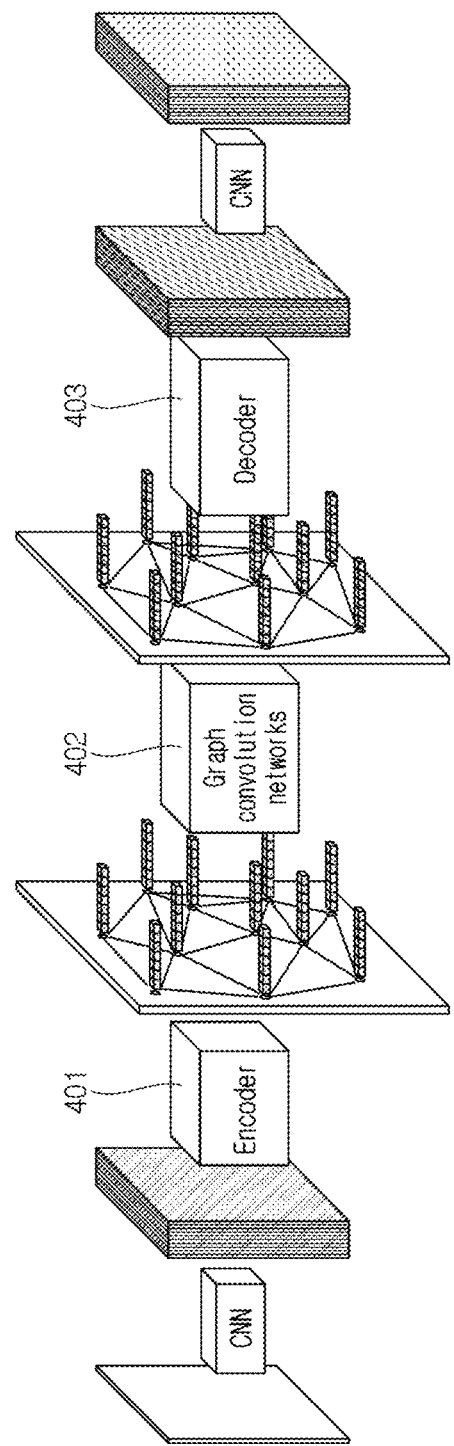
FIG. 4 illustrates an input feature map and outputting of a feature map through graph transformation according to an embodiment of the present disclosure.

FIG. 4 illustrates a feature map and outputting of a feature map through graph transformation according to an embodiment of the present disclosure. Specifically, it relates to an embodiment using the encoder and decoder of FIG. 4 and FIG. 5, when a per-pixel analysis result (e.g., classification/estimation) is required like in image segmentation or depth estimation.

As an example, a feature information processing system, which performs the feature map and graph transformation of FIG. 4, may be associated with the process of FIG. 2 to FIG. 3 and include a convolution layer (e.g., CNN) encoder 401, an artificial neural network (e.g., a graph convolution network (GCN)) 402, a decoder 403, and a convolution layer (e.g., CNN).

As an example, the encoder 401 may include the encoder of FIG. 1, and the decoder 403 may include a decoder that performs the process of FIG. 3. In addition, the encoder and the decoder may be included in the feature information processing apparatus of FIG. 8 or be expressed as a feature information processing apparatus itself.

As an example, an input image may be input into the encoder 401 through a convolution layer. An input image input into an encoder may have a form expressed in a feature map. An encoder may transform a feature map into a graph feature associated with a feature vector by executing a process described with reference to FIG. 1 and FIG. 2, and the graph feature may be processed using an artificial neural network (e.g. GCN) 402.

Next, an output may be derived using the decoder 403, which executes the transformation of FIG. 3, and a convolution layer. The output thus derived may be formed in a feature map representing pixels. Main high-level processing may be performed through the memory-efficient graph based ANN 402, but the decoder 403 and a convolution layer may be further utilized to output a feature map and thus to obtain a per-pixel analysis result.

Figure 5:
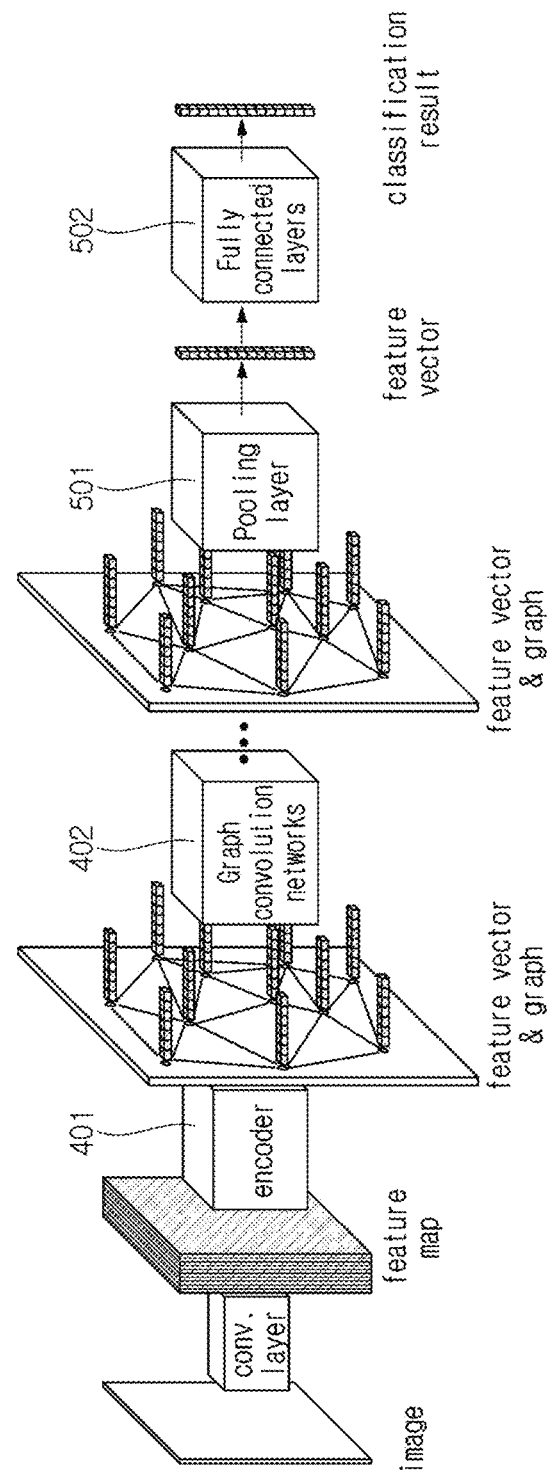
FIG. 5 illustrates an image classification process according to a feature map and graph transformation in accordance with an embodiment of the present disclosure.

FIG. 5 illustrates an image classification process according to a feature map and graph transformation in accordance with an embodiment of the present disclosure.

Specifically, being a drawing for describing the process of FIG. 4 in further detail, FIG. 5 is a view showing an application example of deriving an image classification result by outputting a feature map through feature map and graph transformation.

Before the process of FIG. 5 is described, it is assumed, through the process of FIG. 4, that transformation between a feature map and a graph-feature vector is performed through the encoder 401 and feature information is processed through the artificial neural network 402. That is, it is assumed that, after a feature map for an image is obtained and then is transformed into a form of graph feature using a module performing the feature map-graph feature transformation of FIG. 2, certain processing is performed through the graph-based neural network 402.

Next, a per-pixel analysis for a feature vector and a graph may be performed through a pooling layer 501 and a fully-connected layer 502. As an example, the per-pixel analysis may include an image classification result or an image depth estimation result in each pixel.

As an example, the pooling layer 501 and/or the fully-connected layer 502 may be included in a decoder, and the decoder may be the decoder 403 of FIG. 4.

FIG. 6 illustrates a method for processing feature information based on an artificial neural network according to an embodiment of the present disclosure.

Specifically, FIG. 6 is a view for describing an example of an ANN-based feature information processing method based on the feature map-graph feature transformation process that is mentioned above. The process of FIG. 6 may be implemented by the above-mentioned encoder or the ANN-based feature information processing apparatus of FIG. 8.

First, a process of extracting (S601) a graph based on a feature map may be performed. The feature map may be based on an input image, and the graph may be expressed to include information on a vertex and a connection relationship between each vertex. As an example, a vertex may be obtained using the feature map and an importance map for the feature map, which is obtained through a convolution layer. As mentioned above, the process of extracting a graph from a feature map may include a process that goes through a 2D convolution layer and non-maximal suppression. In addition, as an example, the information on the connection relationship between the vertices may include an edge set and an adjacency matrix for the vertices. In addition, the edge set and the adjacency matrix may be obtained using a k-nearest neighbors algorithm, a random sampling algorithm, or a Delaunay triangulation algorithm.

Next, a process of extracting (S602) a feature vector for a vertex of the extracted graph may be performed. The feature vector may be obtained through a graph convolution layer. As an example, the feature vector may be obtained using a k-nearest neighbors algorithm or a random sampling algorithm.

Next, the graph and the feature vector may be processed (S603) based on an artificial neural network. As an example, herein, the artificial neural network may be a graph convolution network (GCN). Thus, instead of processing a feature map itself that is mainly used in image information processing, it is possible to use a graph and a feature vector form that are efficient in terms of memory and the number of parameters.

When constructing a graph according to the present disclosure, a receptive field with flexible shape may be obtained unlike a rectangular receptive field of a convolution layer. In addition, when a plurality of artificial neural networks is driven as proposed in the present disclosure, efficient data processing may be possible.

Meanwhile, since FIG. 6 is an embodiment of the present disclosure so that the present disclosure is not limited thereto, some steps may be added, some steps may be deleted, or some steps may be implemented at the same time, and the order of steps may also be changed.

FIG. 7 illustrates a method for processing feature information based on an artificial neural network according to another embodiment of the present disclosure.

Specifically, FIG. 7 is a view for describing an example of an ANN-based feature information processing method based on the graph feature-feature map feature transformation process that is mentioned above. The process of FIG. 7 may be implemented by the above-mentioned decoder or the ANN-based feature information processing apparatus of FIG. 8 and include all or some of an inverse process to FIG. 2. As an example, processing of a feature map and each image pixel of FIG. 7 may be performed when necessary.

As an example, the ANN-based feature information processing method of FIG. 7 may be implemented after the ANN-based feature information processing method of FIG. 6 is implemented, but the present disclosure is not limited thereto.

First, a graph and a feature vector, which are processed based on an artificial neural network, may be obtained (S701). As an example, the graph and the feature vector may be extracted from a feature map of an image, and various artificial neural networks like GCN may be used as the artificial neural network. The graph may be expressed by information on a vertex and a connection relationship between vertices, and information including the connection relationship between vertices may be the same as described in FIG. 6.

Next, a feature map of an image may be output (S702) based on the graph and the feature map. The graph and feature vectors associated with a vertex of the graph may be associated with a pixel of the image. The pixel of the feature map and the vertex of the graph may have one-to-one correspondence but may also have n-to-one correspondence.

Next, a per-pixel analysis result of the image may be obtained (S703) based on the feature map. The per-pixel analysis result of the image may include a per-pixel classification/estimation result like an image depth estimate, an image segmentation and/or motion estimate. The above analysis result may be output through a pooling layer and/or a fully-connected layer.

FIG. 8 illustrates an apparatus for processing feature information based on an artificial neural network according to an embodiment of the present disclosure.

Specifically, FIG. 8 is a view for describing an example of an apparatus capable of implementing an ANN-based feature information processing method based on the graph feature-feature map or feature map-graph feature transformation process that is mentioned above. The processes of FIG. 6 and FIG. 7 may be implemented by the ANN-based feature information processing apparatus of FIG. 8, and the above process performed by an encoder, a decoder and/or a random module may be implemented by the apparatus of FIG. 8.

As an example, the ANN-based feature information processing apparatus 801 of FIG. 8 may include a memory 802 storing data, a transceiver 803 transmitting and receiving data, and a processor 804 controlling the memory 802 and/or the transceiver 803. Meanwhile, other components than those in the drawing may be further included.

As an example, in case the processor 804 includes a function of an encoder, the processor 804 may extract a graph including a vertex based on a feature map, extract a feature vector corresponding the vertex and process the graph and the feature vector based on an artificial neural network, and the graph may include information on a position of a vertex and a connection relationship between vertices. Meanwhile, the artificial neural network may be a graph convolution network (GCN). In addition, the information on the connection relationship between the vertices may include an edge set and an adjacency matrix for the vertices. In addition, the edge set and the adjacency matrix may be obtained using a k-nearest neighbors algorithm, a random sampling algorithm, or a Delaunay triangulation algorithm. In addition, the feature vector may be obtained through a graph convolution layer, and it may be obtained using a K-nearest neighbors algorithm or a random sampling algorithm. In addition, a vertex may be obtained using the feature map and an importance map for the feature map, which is obtained through a convolution layer.

Meanwhile, as another example, in case the decoder 804 includes a function of a decoder, the processor may obtain a graph and a feature vector that are processed based on an artificial neural network, and output a feature map of an image based on the graph and the feature vector. As an example, the feature map may be extracted from an input image, and a per-pixel analysis result of the image may be obtained based on the feature map. As an example, the graph may be expressed in association with the feature vector and include information on a position of a vertex and a connection relationship between vertices. As an example, the artificial neural network may be a graph convolution network (GCN), and a feature of an image, which is output, may be output through a convolution layer. In addition, the per-pixel analysis result may be used for image segmentation, image classification, depth estimation, motion estimation of an object in an image and the like and may be obtained through a fully-connected layer.

Figure 9:
FIG. 9 illustrates a region segmentation result based on feature information processing according to an embodiment of the present disclosure.

FIG. 9 illustrates a region segmentation result based on feature information processing according to an embodiment of the present disclosure.

A neural network implemented using feature map-graph feature transformation and a graph convolution layer and a CNN-based neural network were compared in terms of performance by using Cityscapes datasets. Herein, a GCN was used as the neural network including the transformation and the graph convolution layer. A feature pyramid network (FPN) was built using the two neural networks. Table 2 shows the performance comparison between CNN and GCN.

TABLE 2

|  | Accuracy (mIoU) | Memory usage | Parameter storage capacity |
|---|---|---|---|
| CNN-based FPN | 70.4% | 20 GB | 2433 MB |
| GCN-based FPN | 68.2 | 12 GB | 606 MB |

The two neural networks show similar accuracy, but the graph convolution-based method using a module of the present disclosure is significantly more efficient with respect to memory usage and parameter storage capacity.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In addition, the embodiments may be implemented not by only one software program but by a combination of two or more software programs, and one subject may not execute a whole process. For example, a deep learning process requiring advanced data operation capability and massive memory may be performed in a cloud or a server, and a user may use only a neural network that completes deep learning, but it is evident that the present disclosure is not limited to this implementation.

In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation. For example, various types of implementations including the general processor may be possible. It is also evident that one hardware unit or a combination of two or more hardware units may be applied to the present disclosure.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

As an example, a computer program stored in a non-transitory computer-readable medium according to an embodiment of the present disclosure may include: extracting, in a computer, a graph consisting of vertices based on a feature map of an image; extracting a feature vector corresponding to the vertices; and processing the graph and the feature vector based on an artificial neural network, and the graph may include information on positions of the vertices and a connection relationship between the vertices.

Meanwhile, contents described with reference to respective drawings are not limited each corresponding drawing but may be applied in a complementary way unless there is concern of inconsistency.

It will be apparent to those skilled in the art that various substitutions, modifications and changes are possible are possible without departing from the technical features of the present disclosure. It is therefore to be understood that the scope of the present disclosure is not limited to the above-described embodiments and the accompanying drawings.

What is claimed is:

1. An apparatus for processing feature information based on an artificial neural network, the apparatus comprising:
   a memory configured to store data; and
   a processor configured to control the memory and perform an encoding operation and a decoding operation,
   in the encoding operation, the processor is configured to:
   obtain a first feature map of a first image through a first convolution layer,
   obtain an importance map for the first feature map by passing the first feature map through a second convolution layer,
   obtain first vertices, required for extracting a graph feature for the first image, using the first feature map and the importance map,
   extract a first graph, which includes the first vertices, based on the first feature map,
   obtain first feature vectors corresponding to the first vertices by passing per-pixel feature vectors extracted from the first feature map through a graph convolution layer, and
   process the first graph and the first feature vectors based on an artificial neural network, and
   wherein the first graph includes positions of the first vertices and information on a connection relationship between the first vertices,
   in the decoding operation, the processor is configured to:
   obtain a second graph including second vertices, and second feature vectors, which are processed based on the artificial neural network,
   output a second feature map of a second image based on the second graph and the second feature vectors, and
   obtain a per-pixel analysis result of the second image based on the second feature map, and
   wherein the second graph includes positions of the second vertices and information on a connection relationship between the second vertices.

2. The apparatus of claim 1, wherein the artificial neural network is a graph convolution network (GCN).

3. The apparatus of claim 1, wherein the information on the connection relationship between the first vertices includes an edge set and an adjacency matrix for the first vertices.

4. The apparatus of claim 3, wherein the edge set and the adjacency matrix are obtained using a k-nearest neighbors algorithm, a random sampling algorithm, or a Delaunay triangulation algorithm.

5. The apparatus of claim 1, wherein the first feature vectors are obtained using a k-nearest neighbors algorithm or a random sampling algorithm.

6. The apparatus of claim 1, wherein the second feature map of the second image is output through a third convolution layer.

7. The apparatus of claim 1, wherein the per-pixel analysis result is obtained through fully-connected layers.

8. A method for processing feature information based on an artificial neural network, the method comprising:
   performing an encoding operation comprising:
   obtaining a first feature map of a first image through a first convolution layer;

obtaining an importance map for the first feature map by passing the first feature map through a second convolution layer;

obtaining first vertices, required for extracting a graph feature for the first image, using the first feature map and the importance map;

extracting a first graph consisting of the vertices based on the first feature map;

obtaining first feature vectors corresponding to the first vertices by passing per-pixel feature vectors extracted from the first feature map through a graph convolution layer; and processing the first graph and the first feature vectors based on an artificial neural network, wherein the first graph includes positions of the first vertices and information on a connection relationship between the first vertices, and performing a decoding operation comprising:

obtaining a second graph including second vertices, and second feature vectors, which are processed based on the artificial neural network, outputting a second feature map of a second image based on the second graph and the second feature vectors, and obtaining a per-pixel analysis result of the second image based on the second feature map, and wherein the second graph includes positions of the second vertices and information on a connection relationship between the second vertices.

9. The method of claim 8, wherein the artificial neural network is a graph convolution network (GCN).

10. The method of claim 8, wherein the information on the connection relationship between the first vertices includes an edge set and an adjacency matrix for the first vertices.

11. The method of claim 10, wherein the edge set and the adjacency matrix are obtained using a k-nearest neighbors algorithm, a random sampling algorithm, or a Delaunay triangulation algorithm.

12. The method of claim 10, wherein the first feature vectors are obtained using a k-nearest neighbors algorithm or a random sampling algorithm.

* * * * *